United States Patent [19]

Simonsen et al.

[11] Patent Number: 4,760,744
[45] Date of Patent: Aug. 2, 1988

[54] MASS FLOW METER BASED ON THE CORIOLIS PRINCIPLE

[75] Inventors: Jens K. Simonsen, Nordborg; Frands W. Voss, Sønderborg, both of Denmark

[73] Assignee: Danfoss A/S, Nordborg, Denmark

[21] Appl. No.: 907,103

[22] Filed: Sep. 15, 1986

[30] Foreign Application Priority Data

Sep. 26, 1985 [DE] Fed. Rep. of Germany ....... 3534288

[51] Int. Cl.⁴ .............................................. G01F 1/84
[52] U.S. Cl. .................................................. 73/861.38
[58] Field of Search .......................... 73/861.38, 32 A

[56] References Cited

U.S. PATENT DOCUMENTS 3,444,723  5/1969  Wakefield ........................... 73/32 A
4,622,858  11/1986  Mizerak ............................. 73/861.38

FOREIGN PATENT DOCUMENTS 8505677  12/1985  World Int. Prop. O. ....... 73/861.38

Primary Examiner—Herbert Goldstein
Attorney, Agent, or Firm—Wayne B. Easton

[57] ABSTRACT

A mass flow meter based on the Coriolis principle. The meter has two rectilinear measuring tubes juxtaposed in parallel and mechanically connected at adjacent ends thereof. An oscillation generator is connected to the tubes between the ends thereof for driving the tubes in opposite directions. A sensor connected to the tubes on opposite sides of the oscillation generator sense and signal relative oscillations of the tubes which is indicative of the flow through the tubes. The measuring tubes have different bending strengths in two perpendicular axial planes thereof to reduce the amplitudes of vibration in the plane normal to the plane of interest. Individual masses applied to the measuring tubes cause the natural frequency of at least the first mechanical harmonic of the measuring tubes to differ from the natural frequency of the mechanical fundamental counter-oscillation by a factor x which differs from a whole number by at least 0.1.

16 Claims, 1 Drawing Sheet

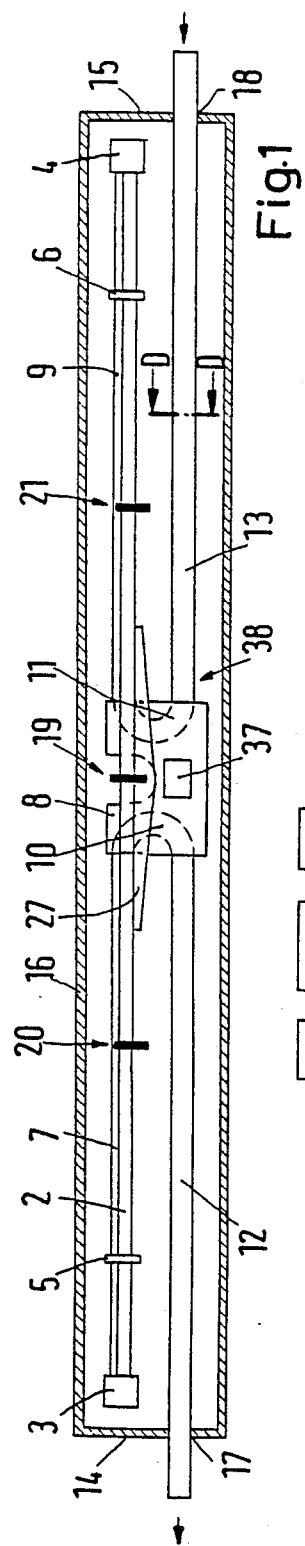

MASS FLOW METER BASED ON THE CORIOLIS PRINCIPLE

The invention relates to a mass flow meter based on the Coriolis principle, wherein two rectilinear measuring tubes are juxtaposed in parallel and mechanically interconnected at their ends, an oscillation generator driving the measuring tubes in opposite senses is provided substantially at the middle of the measuring tubes, and sensors disposed at a spacing in front of and behind the oscillation generator deliver measuring signals by reason of the relative oscillations of the measuring tubes, the flow being derivable from the measuring signals.

In a meter of this kind disclosed in prior Patent Application No. P 34 43 234.5-52, the two measuring tubes are connected at their ends by way of a respective tube coupling to compensating tubes of substantially equal length parallel to the measuring tubes. At the central zone, the compensating tubes are secured to a common beam and there connected to a respective connecting tube which is likewise parallel to the measuring tubes. The remote ends of the connecting tubes are fixed in the walls of a housing enclosing the said tubes. In this meter, the lateral overhang is small. The compensating tubes ensure that changes in length as a result of temperature fluctuations do not lead to stresses in the measuring tubes that might change the oscillating behaviour and hence falsify the measurement. Any stresses that occur are taken up only in the connecting tubes and the beam, where they have no influence on the measuring result.

In operation, the oscillation generator is driven by an oscillating circuit which is operated at the natural frequency of the mechanical fundamental counter-oscillation of the measuring tubes by feedback utilising the measuring signal of a sensor. Depending on the amount of flow, a phase displacement of this oscillating movement is set up over the length of the measuring tubes, from which the quantity of flow of the mass can be derived.

The problem of the invention is to increase the measuring accuracy of a mass flow meter of the aforementioned kind.

The solutions hereinafter described, which can be used as alternatives or together, are based on the common principle of avoiding or reducing mechanical oscillations that might have a detrimental influence on the measuring result.

A first solution of the stated problem is characterised in that the measuring tubes have a different bending strength in two perpendicular axial planes.

The particular measuring tube oscillates at different natural frequencies in the two axial planes. Only one of these can correspond to the excitation frequency. For this reason, a marked oscillation is obtained in the respective axial plane. Rotational motion (wobbling) is much reduced. This facilitates more accurate measurement.

It is particularly favourable for the measuring tubes to have a higher bending strength perpendicular to the axial plane defined by their axes than they do in said axial plane.

In this way, one ensures that the oscillations transverse to the principal axial plane are for the most part eliminated. On the one hand, the higher bending strength already inherently leads to lower amplitudes. On the other hand, the excitation frequency for bending transversely to the principal axial plane no longer coincides with the excitation frequency for oscillations in the principal axial plane. The measuring tubes therefore primarily execute a reciprocating motion in the principal axial plane. The sensors are influenced by the full instantaneous value of the measuring tube oscillation and not only by a component of this value. The measuring error is correspondingly low. There is the additional advantage that the parts of the oscillation generator secured to the two measuring tubes (generally a coil in which a driving magnet engages) retain their central position. There is therefore no danger of the magnet striking the coil. The elimination of oscillations transversely to the axial plane also reduces the oscillating amplitude as a whole. This results in lower strains on the material, especially where the measuring tubes are secured at their ends, and thus a longer life.

In a particularly simple construction, the measuring tubes are stiffened at least in the region of their largest amplitude by means of a fin extending perpendicular to the principal axial plane. Such a fin can be readily soldered or welded to a measuring tube. If the central portion of the measuring tubes is stiffened, their tendency to oscillate transversely to the axial plane is extremely low.

Alternatively, the measuring tubes may have a cross-section having a larger dimension perpendicular to the principal axial plane than in said plane. In particular, the measuring tubes may have an oval cross-section. Measuring tubes of quadrilateral cross-section can also be considered.

A second solution of the aforresaid problem is characterised according to the invention in that, by applying individual masses, the natural frequency $f_n$ of at least the first mechanical harmonic of the measuring tubes differs from the natural frequency $f_o$ of the mechanical fundamental counter-frequency by a factor x deviating from a whole number by at least 0.1.

The sensors form the respective measuring signal from the superpositioning of the different mechanical oscillations. The mechanical harmonics cannot be avoided but, since constructional measures are taken to give them a natural frequency which markedly differs from a multiple of the natural frequency of the fundamental oscillation, separation of the interfering proportion is readily possible, for example by means of a low pass filter. Even if the measuring signal is directly evaluated, for example by monitoring the instant at which a predetermined limiting value is exceeded, accurate measuring results are obtained because superimposing leading to a measuring error occurs only occasionally rather than at each measurement. Another advantage is that excitation of the mechanical harmonics is to a large extent eliminated. Even if nonlinearities of electric and electronic components cause the oscillation generator to be supplied with an excitation current which not only has the natural frequency of the mechanical fundamental counter-oscillation of the measuring tubes but also their harmonics, one need not fear such stimulation of the harmonics because they clearly differ from the natural frequency of the harmonics. It is sufficient to consider up to the 15th harmonic because higher harmonics have no substantial influence.

To achieve particularly good results, it is advisable to have the factor x at 2.5 to 2.9 preferably 2.7 for the natural frequency $f_1$ of the first mechanical harmonic. In this way, the spacing from the whole number multiple of the natural frequency $f_o$ is particularly large.

The individual masses are particularly formed by bodies secured to the measuring tubes. One can thereby achieve adaptation to individual cases by appropriately selecting the body.

In this case it is favourable if the body is secured to the holder which also connects a part of the sensor to the measuring tube. No additional securing means need therefore be provided at the measuring tube.

Alternatively, the individual masses may be formed by a ring which is displaceable on the measuring tube and can be locked in position. In this case, adaptation can be brought about by retaining the mass but altering its position.

The individual mass can also be formed by an annular upset portion of the tube.

In a further embodiment, a further individual mass is applied to the central zone of only one measuring tube. With the aid of this, the natural frequency $f_o$ of the mechanical fundamental counter-oscillation of this measuring tube is accurately adapted to that of the other measuring tube for the purpose of achieving the best possible oscillating circuit. If the oscillating behaviour is the same for both measuring tubes, one can make do with a low pass filter of narrow band width and thereby achieve a particularly clean separation between the part of the measuring signal corresponding to the fundamental oscillation and the part corresponding to the harmonics.

It is also favourable for the measuring tubes to be inter connected at their ends at two axially offset positions so that a mechanical fundamental synchronous oscillation is obtained of which the natural frequency $f_o'$ is smaller than the natural frequency $f_o$ of the mechanical fundamental counter oscillation. In this way, the component of the measuring signal arising out of the fundamental synchronous oscillation of the measuring tubes likewise differs in frequency from that of the fundamental counter-oscillation. With the aid of a filter of the appropriate band width, it is therefore also possible to filter out the proportion of frequency corresponding to the fundamental synchronous oscillation.

In a mass flow meter wherein, further, the measuring tubes are connected at their ends by way of a respective tube coupling to compensating tubes of substantially equal length parallel to the measuring tubes, the compensating tubes are secured at their central zone to a common beam and there connected to a connecting tube which is likewise parallel to the measuring tubes and the remote ends of the connecting tubes are fixed, particularly in the end walls of a housing surrounding all the said tubes. A third solution of the aforesaid problem is characterised according to the invention in that the oscillating system consisting of the clamped connecting tubes and the beam loaded by the rest of the meter is designed for a natural frequency of the mechanical fundamental oscillation that is smaller than the natural frequency $f_o$ of the mechanical fundamental counter-oscillation of the measuring tubes.

The oscillating system can, for example, be excited by oscillations in the tube system in which the meter is connected. However, since the oscillating system will then oscillate at a natural frequency differing from that of the measuring tubes, there is no danger of the measuring tubes being excited to execute oscillations that might falsify the measuring result.

Desirably, the natural frequency $f_o$ of the mechanical fundamental oscillation of the oscillating system should also be smaller than the natural frequency $f_o'$ of the mechanical fundamental synchronous oscillation of the measuring tubes. Accordingly, the measuring tubes will also not be excited in an interfering manner when in synchronism.

Further, it is favourable if the natural frequency $f_{an}$ of at least the first mechanical harmonic of the oscillating system likewise departs from the natural frequency of the mechanical fundamental counter-oscillation or one of its harmonics. The measuring tubes will then also not be excited by mechanical harmonics of the oscillating system.

Preferably, adaptation of the natural-frequency of the oscillating system is carried out by applying an auxiliary mass to the beam or to the connecting tubes. By increasing the mass, the natural frequency is continuously decreased. A marked spacing can therefore be achieved from the natural frequency of the measuring tubes.

For example, the auxiliary mass may be a body secured to the beam. Different frequencies can be achieved by exchanging the body.

Alternatively, the auxiliary mass may be a sleeve on the connecting tube.

It is particularly favourable if the sleeve is made of oscillation damping material. Alternatively, the sleeve consists of an outer tube connected to the connecting tube by way of a damping intermediate layer. These measures ensure that oscillations emanating from the outer tube system are strongly damped and can therefore not influence the measuring tubes.

It is also recommended that the compensating tubes together have the same thermal mass as do the measuring tubes together. This ensures that, upon commencement of operation, the compensating tubes and measuring tubes warm up substantially equally to avoid interfering frequencies caused by different thermal elongations.

Preferred examples of the invention will now be described in more detail with reference to the drawing, wherein:

FIG. 1 is a longitudinal section through the housing of a mass flow meter according to the invention.

FIG. 2 is a plan view of the meter of FIG. 1 with an indication of the electrical circuit.

FIG. 3 is a section on the line A—A in FIG. 2.

FIG. 4 is a side elevation of the FIG. 3 representation.

FIG. 5 is a section on the line B—B in FIG. 2.

FIG. 6 is a section through a different embodiment corresponding to the line C—C in FIG. 2.

FIG. 7 shows an alternative construction to that of FIG. 4.

FIG. 8 shows a further alternative to that of FIG. 4 and

FIG. 9 is a section on the line D—D in FIG. 1 through a connecting tube of a modified embodiment.

In the example of FIGS. 1 to 5, two straight measuring tubes 1 and 2 are juxtaposed in parallel. They are interconnected at their ends on the one hand by tube couplings 3 and 4 and on the other hand by lugs 5 and 6. The lugs 5 and 6 are fixed to the measuring tubes 1 and 2 but surround the compensating tubes 7 and 9 with play (also see FIG. 6). A first compensating tube 7 extends from the tube coupling 3 to a centrally disposed beam 8. A second compensating tube 9 extends from the tube coupling 4 to the beam 8. In this beam there are passages 10 and 11 which connect the compensating tubes 7 and 9 to connecting tubes 12 and 13, respectively. The latter pass through the end walls 14 and 15 of a housing 16 which hermetically encloses the aforesaid arrangement and they are welded in position at the places 17 and 18 where they pass through. Accordingly, the measuring tubes 1, 2, the tube couplings 3, 4, the compensating tubes 7, 9 and the beam 8 are held solely by the connecting tubes 12, 13.

In the middle, there is an oscillation generator 19 which will be described in more detail in conjunction with FIG. 5. A magnetic coil 192 is seated on a holder 191 secured to the measuring tube 1. A driving magnet 194 seated on a holder 193 secured to the measuring tube 2 is centrally aligned with the magnetic coil 192. The excitation circuit drives the measuring tubes in counter-phase. In this counter-phase, the measuring tubes oscillate between the lugs 5 and 6. Between the tube couplings 3 and 4, the measuring tubes can oscillate only in synchronism, namely at a lower frequency of the mechanical fundamental oscillation than that of the fundamental counter-oscillation.

Further, two sensors 20 and 21 are provided between the respective oscillation generator 19 and the ends of the measuring tubes, the sensor 20 being shown in FIG. 3. A holder 201 for a flat magnetic coil 202 is secured to the measuring tube 1. A holder 203 for a permanent magnet 204 is secured to the measuring tube 2. When the measuring tubes execute any kind of relative motion, a voltage is induced in the flat coil 202 depending on the velocity of the relative motion.

An oscillation exciter circuit 22 comprises an oscillator to which the measuring signal of the sensor 21 is fed and which therefore sets itself to the condition of resonance predetermined by the natural frequency of the mechanical fundamental counter-oscillation of the measuring tubes 1 and 2. The measuring signals of the two sensors 20 and 21 are fed by way of a respective low pass filter 24 or 25 to an evaluating circuit 23 for determining the flow. These low pass filters have a narrow band width and are tuned to the natural frequency of the mechanical fundamental counter-oscillation of the measuring tubes 1 and 2. It is in each case determined when the filtered signal exceeds a constant threshold value. The two instants so determined characterise a phase displacement which is a measurement of the particular flow of mass.

In the region of their highest amplitude of oscillation, i.e. at the middle, the measuring tubes 1 and 2 are provided with fins 26 or 27 which project downwardly and are reduced in height towards the ends. In this way, the bending strength is increased in the plane that is perpendicular to the principal axial plane 28. Consequently, the parts 202 and 204 of the sensors 20 and 21 do not execute any marked vertical movement but oscillates only in the principal axial plane 28. Also, the driving magnet 194 retains its central position in relation to the magnetic coil 192.

An alternative form of stiffening is shown in FIG. 6 where the two measuring tubes 1a and 2a have an oval cross-section of which the smallest dimension is in the principal axial plane 28.

According to FIGS. 3 and 4, individual masses 29 and 30 in the form of cylindrical bodies provided on the holder 201 and 203 are secured in position with the aid of screws 31 and nuts 32. Corresponding individual masses are also provided on the carriers of the sensor 21. By appropriately selecting these bodies one can ensure that the natural frequency $f_n$ of at least the first mechanical harmonic of the measuring tubes 1 and 2 differs from the natural frequency $f_o$ of the mechanical fundamental counter-oscillation by a factor x which departs from a whole number by at least 0.1. In particular, this factor x is 2.5 to 2.7. By applying further individual masses at different parts of the measuring tubes, the harmonics of a higher order can also be taken into consideration. Should the excitation current for the magnetic coil 192 contain harmonic oscillations, as is easily possible in the case of nonlinear circuit elements, the measuring tubes are not excited with their mechanical harmonics because the frequencies are different. In addition, the proportions produced in the measuring signals by the mechanical harmonics can be readily filtered out by the low pass filters 24 and 25.

As is shown in FIG. 5, a further individual mass 33 is secured with the aid of a screw 34 to the middle of the holder 193 of the oscillation generator 19. In this way, the natural oscillations of the two measuring tubes 1 and 2 are accurately adapted to each other in the principal axial plane 28. Normally, the measuring tube 1 that has to carry the coil 192 is somewhat more heavily loaded than is the measuring tube 2.

FIG. 7 shows that an individual mass 34 can also be provided in the form of an upset portion of a measuring tube 2b.

FIG. 8 shows that an individual mass 35 can be provided in the form of a ring which is displaceable on the measuring tube 2 and can be fixed in position by means of a screw 36.

In the FIG. 1 embodiment, an auxiliary mass 37 is secured as a body to the central beam 8. This ensures that the oscillating system 38 consisting of the clamped connecting tubes 12 and 13 as well as the beam 8 loaded by the rest of the meter has a natural frequency $f_{ao}$ for the mechanical fundamental oscillation that is lower than the natural frequency $f_o$ of the mechanical fundamental counter-oscillation of the measuring tubes 1 and 2. In addition, the connecting tubes 12 and 13 are provided with a layer of lacquer having oscillation damping properties.

An alternative construction is shown in FIG. 9 where a connecting tube 13a is surrounded by a sleeve 39 in the form of an outer tube, a damping intermediate layer 40 being disposed between the tubes. If oscillations are transmitted from the tube system in which the meter is connected up to the connecting tubes 12 and 13, they are passed on to the measuring tubes 1 and 2 only in a damped form.

By using the compensating tubes 7 and 9 it is possible that the measuring tubes will not have to take up axial stresses arising out of elongations caused by temperature fluctuations. The measuring result is therefore not influenced either by interfering oscillations or by thermal stresses. In addition, the compensating tubes together have the same thermal mass as do the measuring tubes 1 and 2 together. In operation, these tubes therefore expand in like manner and simultaneously. Thermal stresses are therefore avoided during operation.

We claim:

1. A mass flow meter based on the Coriolis principle, comprising, two rectilinear measuring tubes juxtaposed in parallel and mechanically connected at adjacent ends thereof, an oscillation generator connected to said tubes between said ends for driving said tubes in opposite directions, sensor means connected to said tubes on opposite sides of said generator for sensing and signalling relative oscillations of said tubes indicative of the flow through said tubes, individual masses connected to said measuring tubes to make the natural frequency $f_n$ of at least the first harmonic of said measuring tubes different from the natural frequency $f_o$ of the fundamental oscillation by a factor x which differs from a whole number by at least 0.1.

2. A meter according to claim 1 characterized in that for said natural frequency $f_n$ of the first harmonic the factor x is from 2.5 to 2.9.

3. A meter according to claim 1 characterized in that said individual masses are formed by bodies secured to said measuring tubes.

4. A meter according to claim 3 including brackets connected to said measuring tubes, said sensor means and said individual masses being connected to said brackets.

5. A meter according to claim 1 characterized by said individual masses being formed as a ring which is displaceable on one of said measuring tubes and can be locked in position.

6. A meter according to claim 1 characterized in that said individual masses are formed by annular bulges in said measuring tube.

7. A meter according to claim 1 characterized in that a further individual mass is applied to the midpoint of one of said measuring tubes to adapt said natural frequency $f_o$ of said fundamental oscillation of said one measuring tube accurately to that of the other of said measuring tubes to achieve an optimum oscillating cycle.

8. A meter according to claim 1 characterized in that said measuring tubes are interconnected at points offset from their ends so that a fundamental oscillation is produced of which the natural frequency $f_o$ is larger than the natural frequency $f_o$ of said tubes if said tubes were not so interconnected.

9. A mass flow meter based on the Coriolis principle, comprising, two rectilinear measuring tubes juxtoposed in parallel and mechanically connected at adjacent ends thereof, a generator connected to said tubes between said ends for driving said tubes in opposite directions, sensor means connected to said tubes on opposite sides of said generator for sensing and signalling relative oscillations of said tubes indicative of the flow through said tubes, housing means, connecting tube means for supplying fluid to and exhausting fluid from said measuring tubes including two axially aligned compensating tubes of substantially equal length extending parallel to and between said measuring tubes, a beam member connecting said compensating tubes at a point midway between the ends of said measuring tubes, said beam member being connected to said connecting tube means which is likewise parallel to said measuring tubes, and opposite ends of said connecting tubes being attached to said housing means whereby said connecting tubes support an oscillation system, said oscillation system including said connecting tube means, said beam, said measuring and compensating tubes and being designed for a natural frequency $f_{ao}$ that is smaller than the natural frequency $f_o$ of said measuring tubes.

10. A meter according to claim 9 including an auxiliary mass applied to said beam to lower the natural frequencies of said oscillating system relative to said natural frequency $f_o$ of said fundamental oscillation of said measuring tubes.

11. A meter according to claim 10 characterized in that said auxiliary mass is a body secured to said beam.

12. A meter according to claim 9 including an auxiliary mass applied to said connecting tubes to insure that the mass of said oscillation system has a natural frequency $f_{ao}$ lower than said natural frequency $f_o$.

13. A meter according to claim 9 including an auxiliary mass applied as a sleeve to one of said connecting tubes for damping vibrations of said connecting tube relative to said measuring tubes.

14. A meter according to claim 13 characterized in that said sleeve is of an oscillation damping material.

15. A meter according to claim 13 characterized in that said sleeve comprises an outer tube connected to said connecting tube by way of a damping intermediate layer.

16. A meter according to claim 9 characterized in that said compensating tubes together have the same thermal mass as said two measuring tubes together.

* * * * *